United States Patent [19]

Sherrick et al.

[11] Patent Number: 4,803,959
[45] Date of Patent: Feb. 14, 1989

[54] INDEXING SOOTBLOWER

[75] Inventors: Ronald E. Sherrick; Dean C. Ackerman, both of Lancaster; Dean E. Draxton, Rapid City; John C. Matthews; Don W. Smith, both of Lancaster; John G. Stevens, Thornville, all of Ohio

[73] Assignee: The Babcock & Wilcox Company, New Orleans, La.

[21] Appl. No.: 172,709

[22] Filed: Mar. 24, 1988

[51] Int. Cl.⁴ .................. F22B 37/18; F22B 37/48
[52] U.S. Cl. .................................... 122/379; 15/317; 134/167 C; 165/95; 122/382; 122/392
[58] Field of Search ............. 122/379, 390, 391, 392, 122/382; 15/316 R, 316 A, 317; 134/167 C; 165/95

[56] References Cited

U.S. PATENT DOCUMENTS

| | | | |
|---|---|---|---|
| 3,230,568 | 1/1966 | Saltz | 15/317 |
| 3,377,026 | 4/1968 | De Mart et al. | 122/391 X |
| 3,439,376 | 4/1969 | Nelson et al. | 15/317 |
| 4,354,294 | 10/1982 | Silver | 122/392 X |
| 4,437,201 | 3/1984 | Zalewski | 15/316 R |
| 4,445,465 | 5/1984 | Byrd et al. | 15/316 R |
| 4,487,165 | 12/1984 | Weber et al. | 122/392 |

Primary Examiner—Edward G. Favors
Attorney, Agent, or Firm—Harness, Dickey & Pierce

[57] ABSTRACT

A long retracting sootblower for boiler cleaning of the type having a lance tube which is advanced into and out of a boiler and simultaneously rotated, and having one or more nozzles discharging a jet of blowing medium which trace helical paths. An indexing mechanism is provided to change the positioning of the helical paths traced by the nozzles between successive actuation cycles to minimize boiler erosion and mechanical stress caused by repeated blowing medium impact against surfaces within the boiler. the indexing mechanism includes relatively slidable longitudinal advancement rack sections which cause the engaging pinion gears to index by one or more teeth upon each actuation cycle. A movable rack portion is biased by a compliant element to remain in a normal position until initial advancement of the lance carriage which causes the movable portion to be indexed with respect to the fixed portion of the rack. The movable rack portion returns to its normal position during other periods of the actuation cycle thereby providing said indexing.

11 Claims, 4 Drawing Sheets

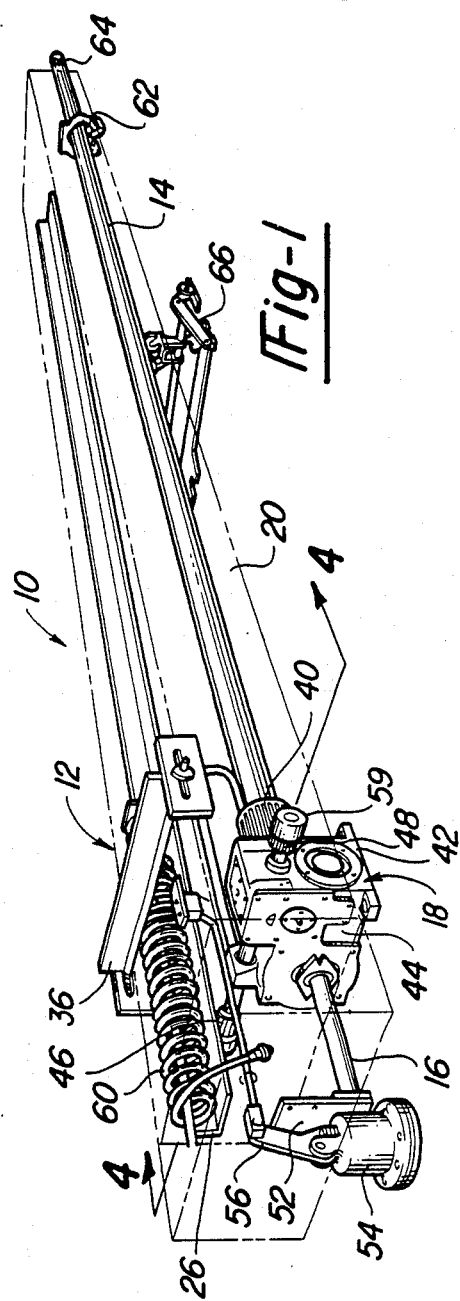
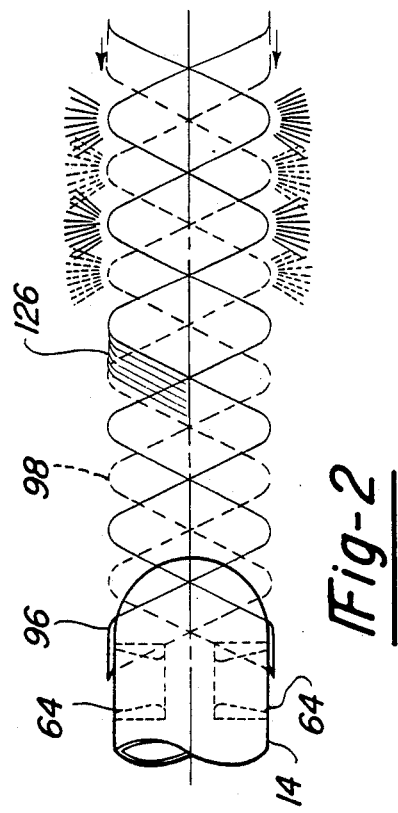

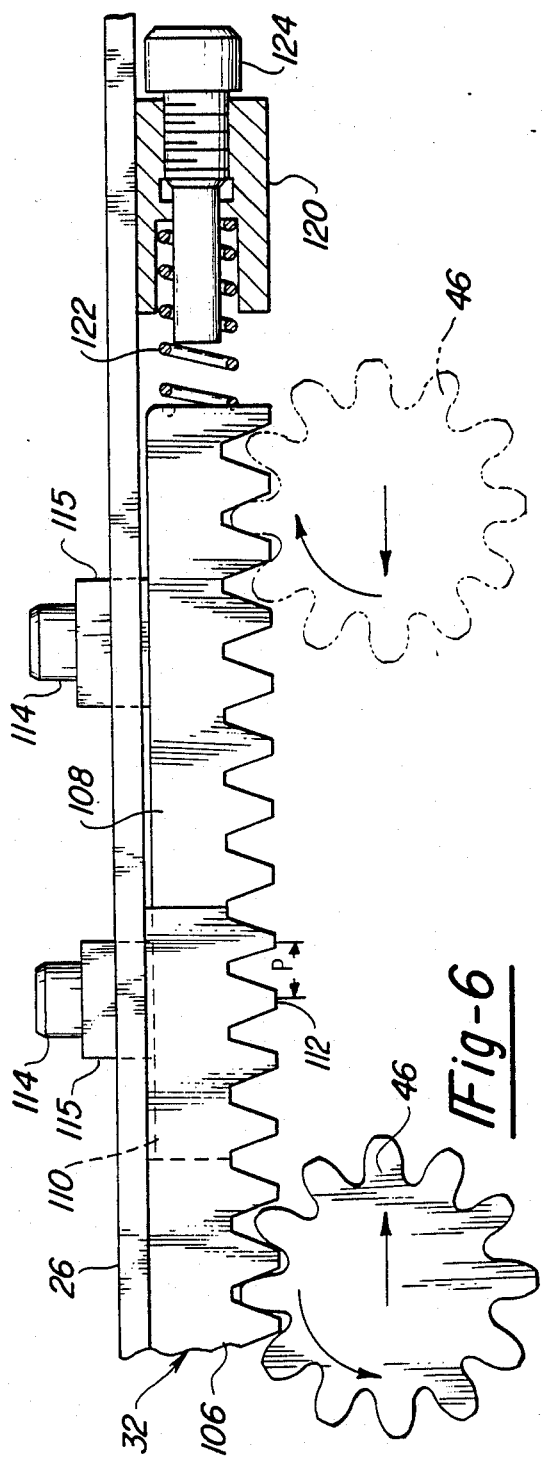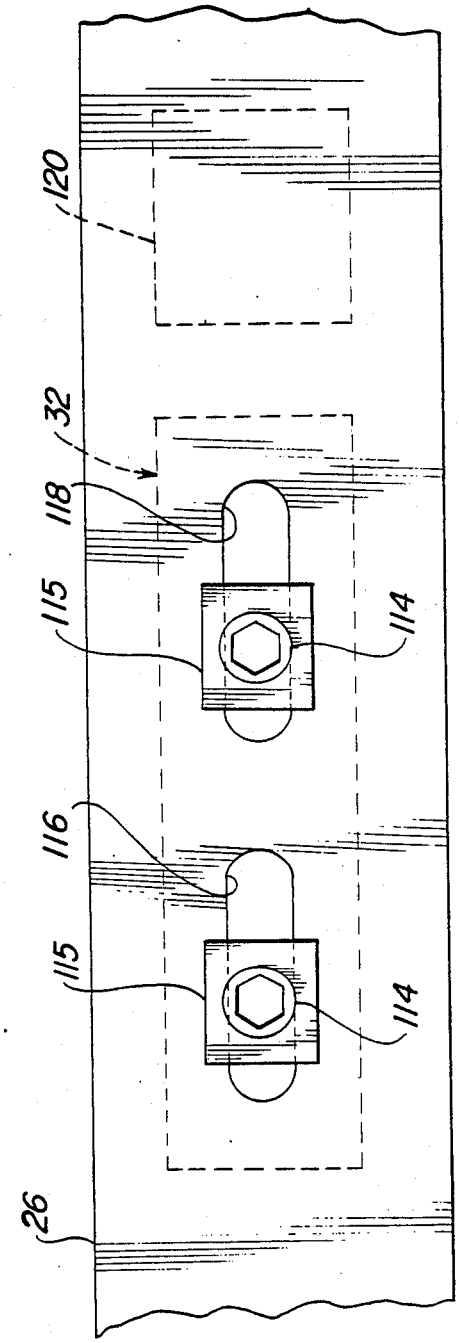

INDEXING SOOTBLOWER

BACKGROUND AND SUMMARY OF THE INVENTION

This invention relates to a long retracting sootblower for boiler cleaning and particularly to one having an indexing lance tube drive system.

Sootblowers are used to project a stream of blowing medium such as water, air or steam against heat transfer surfaces within large scale boilers to cause slag and ash encrustations to be removed. The blowing medium impact produces mechanical and thermal shock which causes these adhering layers to be removed. One general category of sootblowers is known as the long retracting type. These devices have a retractable lance tube which is periodically advanced into and withdrawn from the boiler and is simultaneously rotated such that one or more blowing medium nozzles at the end of the lance tube project jets tracing helical paths.

Many conventional sootblowers, such as the so-called "IK" sootblower manufactured by applicant, include a lost motion device which causes the nozzles to return along a helical path that bisects the helical path of forward travel. This indexing enables surfaces that were not cleaned during extension to be subjected to blowing medium upon retraction. Although the lance tube nozzles trace different helical paths upon extension and retraction, the positions of these helical paths are nonetheless fixed. Heat transfer surfaces continually subjected to impact by blowing medium suffer from erosion and wear. Furthermore, areas lying between the helical paths of the nozzle jets can sometimes escape adequate cleaning. In view of the foregoing, there is a need to provide a long retracting sootblower device having an indexing mechanism which provides a large number of different yet predictable helical paths traced by the lance tube nozzles.

In accordance with this invention, a sootblower is provided having an indexing drive system which displaces the nozzle helical paths slightly upon each sootblower actuation cycle, and thus overcomes the above mentioned disadvantages of prior art designs. The system according to this invention is particularly adapted for sootblowers having a lance tube driving carriage which is advanced and retracted and simultaneously rotates the lance tube. For many long retracting sootblower designs, the carriage has an electric drive motor which is coupled to a drive train having one or more pinion gears which mesh with elongated gear racks to cause the carriage and the lance tube to be retracted and advanced. The carriage also drives the lance tube for rotation through bevel gears.

In the sootblower of the present invention, an indexing system is provided for the longitudinal advancement of the racks which causes the pinion gear meshing with the rack to advance with respect to the rack upon each actuation cycle. Due to the geared connection between the lance tube longitudinal and rotational drive systems, such drive pinion indexing has the effect of causing a slight change in the position of the helical paths traced by the lance nozzles upon each actuation cycle. The indexing mechanism according to this invention operates automatically and can be incorporated into new sootblowers as well as many existing sootblowers as a retrofit application.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a pictorial view showing a long retracting sootblower incorporating the indexing features of the present invention.

FIG. 2 is a pictorial side view showing the helical paths traced by the lance tube nozzles upon extension and retraction for the sootblower shown in FIG. 1.

FIG. 6 is a side view of the rack shown in FIG. 5.

FIG. 7 is a top view of the rack shown in FIG. 5.

DETAILED DESCRIPTION OF THE INVENTION

Figure 3:
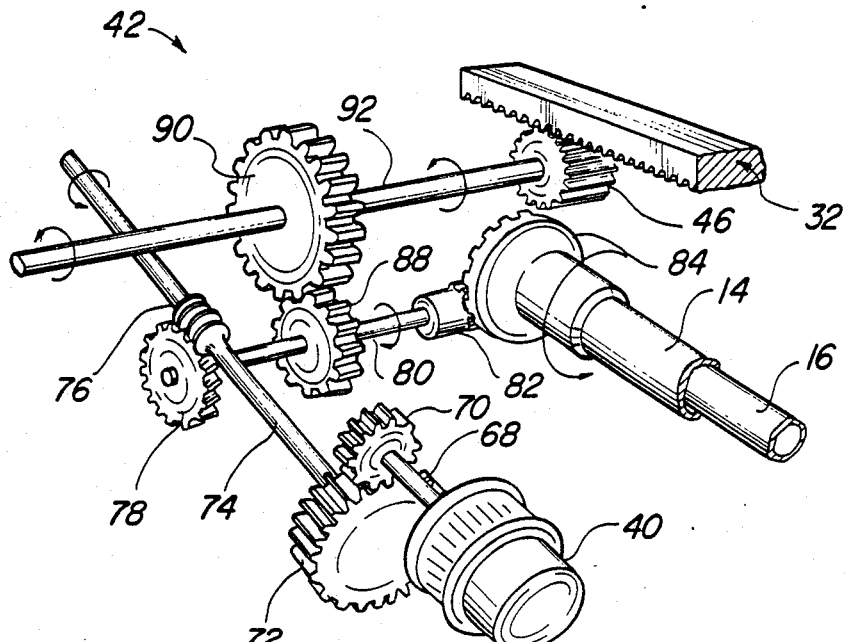
FIG. 3 is a simplified pictorial view showing the drive train arrangement of the sootblower carriage which causes extension and rotation of the lance tube of the sootblower shown in FIG. 1.

A sootblower including the improvements of the present invention is shown in FIG. 1 and is generally designated there by reference number 10. Sootblower 10 principally comprises frame assembly 12, lance tube 14, feed tube 16, and carriage 18. Sootblower 10 is shown in its normal resting position. Upon actuation, lance tube 14 is extended into and retracted from a boiler (not shown) and is simultaneously rotated.

Figure 4:
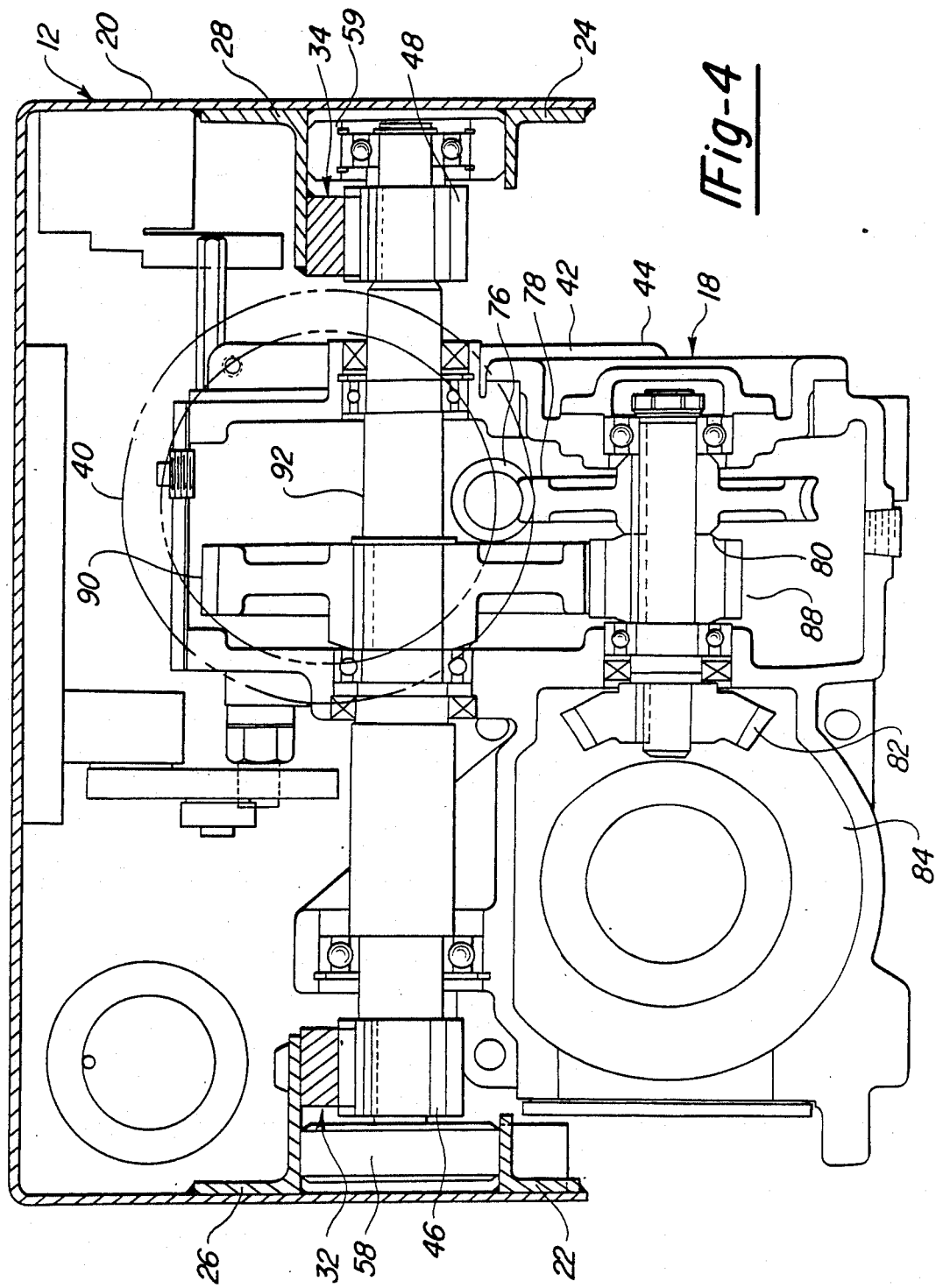
FIG. 4 is a cross-sectional view taken along lines 4—4 from FIG. 1 showing internal components of the carriage.

As best shown in FIG. 4, frame assembly 12 includes a generally rectangularly shaped frame box 20 which forms a housing for the entire unit. Carriage 18 is guided along two pairs of tracks located on opposite sides of frame box 20, including lower tracks 22 and 24, and upper tracks 26 and 28. Tracks 22 through 28 are made from angle iron stock which is connected to frame box 20 by threaded fasteners or welding. Toothed rack assemblies 32 and 34 are rigidly connected to upper tracks 26 and 28, respectively, and are provided to enable longitudinal movement of carriage 18. Frame assembly 12 is supported at a wall box (not shown) which is affixed to the boiler wall or another mounting structure, and is further supported by rear support bracket 36.

Carriage 18 drives lance tube 14 into and out of the boiler and includes drive motor 40 and gear box 42 which is enclosed by housing 44. Carriage 18 drives a pair of pinion gears 46 and 48 which engage rack assemblies 32 and 34 to advance carriage 18 and lance tube 14. Bearings 58 and 59 engage with tracks 22 through 28 to support carriage 18.

Feed tube 16 is attached at one end to rear bracket 52 and conducts blowing medium which is controlled through the action of poppet valve 54. Poppet valve 54 is actuated through linkages 56 which are engaged by carriage 18 to begin blowing medium discharge upon extension of lance tube 14, and cuts off the flow once the lance tube and carriage return to their idle retracted position. Lance tube 14 overfits feed tube 16 and a fluid seal between them is provided by a packing gland (not shown) so that blowing medium is conducted into the lance tube for discharge from nozzles 64.

Coiled electrical cable 60 conducts power to drive motor 40 as it moves with carriage 18. Front support bracket 62 includes bearings which support lance tube 14 during its longitudinal and rotational motion. For long lance tube lengths, an intermediate support 66 may be provided to prevent excessive bending deflection of the lance tube. Additional details of the construction of a well-known design of an "IK" type sootblower is found in U.S. Pat. No. 3,439,376, issued to the assignee of this application which is hereby incorporated by reference.

FIG. 3 provides a pictorial view of the drive train within gear box 42 of carriage 18. Drive motor 40 transmits power through output shaft 68, then through primary spur gears 70 and 72, and into primary output shaft 74. Primary output shaft worm gear 76 meshes with worm spur gear 78 causing rotation of shaft 80. Shaft 80 directly drives rotation bevel gear 82 which meshes with hub bevel gear 84, which is fixed to lance tube 14. Accordingly, bevel gears 82 and 84 impart rotational motion onto lance tube 14 in response to energization of motor 40. Shaft 80 also drives a pair of translation spur gears 88 and 90 which drive translation shaft 92. Pinion gears 46 and 48 (not shown) are affixed to the opposite ends of shaft 92 and mesh with rack assemblies 32 and 34, as previously explained.

As is evident from FIG. 3, due to the direct gear interconnections between the translation and rotational movements of lance tube 14, a fixed relationship in these motions is provided. FIG. 2 graphically illustrates the helical paths traced by a pair of diametrically opposed lance tube nozzles 64 during the extension and retraction movements of lance tube 14 for a conventional sootblower. Helical path 96 shown in full lines represents the paths traced by nozzles 64 during extension. For some designs of sootblowers 10, a lost motion device is positioned at hub 84 which introduces an indexing of the helical paths, such that upon retraction, the helix represented by phantom line 98 traces a path which lies between the paths of helix 96. Even without such a specific lost motion mechanism, drive train backlash is often sufficient to cause such displacement of the extension and retraction helical paths. As mentioned previously, such indexing is provided to enhance cleaning performance and somewhat reduces erosion and wear of the impacted surfaces. However, such indexing does not eliminate such problems since the path positions are fixed. Moreover, significant areas remain between the paths which may not be cleaned adequately. An indexing system is provided in accordance with this invention which changes the positioning of helical paths 96 and 98 in a predictable manner each time sootblower 10 is actuated.

Figure 5:
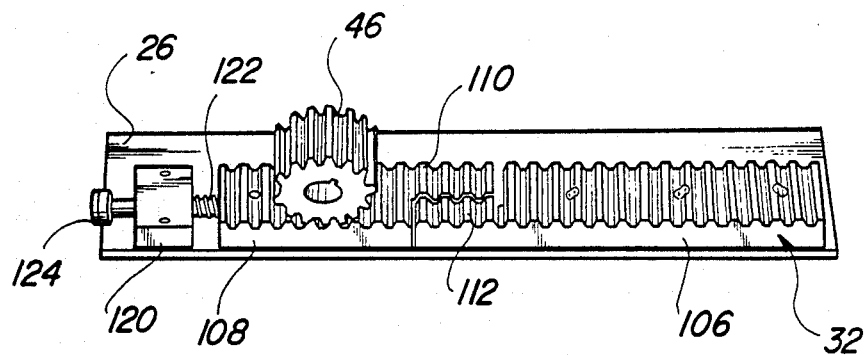
FIG. 5 is an inverted pictorial view of an indexing rack assembly according to the present invention shown with a carriage driving pinion.

FIGS. 5 through 7 illustrate rack assembly 32 which incorporates an indexing mechanism in accordance with this invention. In order to simplify this description, only rack assembly 32 will be described in detail, it being understood that rack assembly 34 is identical in configuration and operation. Rack assembly 32 includes a fixed tooth segment 106 and a longitudinally indexible toothed segment 108. Both rack sections 106 and 108 include narrowed ends 110 and 112 which allow them to interfit in overlapping fashion as shown in FIG. 5, while providing engagement for the full width of pinion gear 46. Other means for overlapping the rack segments could be used with equal success such as a dove-tail joint or side-by-side racks used with a wide pinion gear. Indexible section 108 is mounted to support rail 26 by threaded fasteners 114 which support slide blocks 115 fitting through longitudinally extending slots 116 and 118. Blocks 115 do not firmly clamp against indexible section 108, thus enabling that section to undergo longitudinal displacements. Spring bracket 120 supports coil spring 122 and adjustable stop screw 124. Coil spring 122 urges indexible section 108 to the position shown in FIGS. 5 and 6, in which sections 110 and 112 completely overlap each other. In this position, the interengagement of the teeth of rack sections 106 and 108 properly mesh with pinion gear 46. As an alternative to the use of spring 122, numerous other compliant devices could be employed such as pneumatic cylinders, etc. Stop screw 124 is adjusted so that longitudinal movement of indexible rack segment 108 toward the right with respect to FIG. 6 is equal to one tooth (pitch) distance, as designated by dimension "P" shown in FIG. 6. Alternately, the indexing motion distance could be a multiple of the pitch spacing. Thus, indexible rack 108 is movable between two extreme positions, both of which provide proper meshing with pinion gear 46.

Rack assemblies 32 and 34 are mounted to rails 26 and 28 such that indexible portion 108 is located furthest from the boiler (although the opposite arrangement could be used). FIG. 6 shows pinion gear 46 in its initial position in phantom lines prior to sootblower actuation. In operation, once drive motor 40 is energized to advance the lance, pinion gear 46 acts on indexible rack segment 108 which accelerates carriage 18 from rest, causing a reaction force which compresses coil spring 122. Once the indexing motion of section 108 is completed, pinion gear 46 advances carriage 18. Once the pinion gear 46 is no longer meshing with indexible segment 108, that rack section is permitted to return to its normal position shown in FIGS. 5 and 6 under the influence of coil spring 122. Once carriage 18 is advanced to fully extend lance tube 14, it reverses its motion to return to the idle position. Upon such reverse motion, pinion gear 46, as shown in full lines in FIG. 6, re-engages with indexible segment 108. Accordingly, each actuation cycle of sootblower 10 causes pinion gears 46 and 48 to advance a fixed amount (e.g. one tooth) with respect to the fixed portion of rack segments 106 and 108. This indexing also causes the positioning of helixes 96 and 98 to be displaced since the longitudinal and rotational lance tube drive mechanisms are geared together and the phasing between pinion gears 46 and 48, and rack assemblies 32 and 34 establish the helix orientations. Such indexing is illustrated by lines 126 in FIG. 2 which are partial tracings of various helixes displaced over a succession of actuation cycles. The total number of unique helical paths for a particular sootblower is a function of the extent of indexing motion in the rack, and the gearing relationships within gear box 42 between the pinion drive shaft and the driven member connected to lance tube 14.

Due to the constantly changing helix positions, erosion of particular areas of the boiler due to repeated blowing medium impact is reduced. As outlined previously, as a means of increasing the difference in positions between successive helical paths, rack portions 106 and 108 could be modified, or stop screw 124 adjusted to cause indexing motion equal to two or more pitch spacings of the racks. Rack assemblies 32 and 34 are configured to enable them to be used in place of sections of conventional unitary racks presently used in sootblowers. Therefore, many present sootblowers could be retrofitted with rack assemblies 32 and 34 which provide the indexing capability.

While the above description constitutes the preferred embodiments of the present invention, it will be appreciated that the invention is susceptible to modification, variation and change without departing from the proper scope and fair meaning of the accompanying claims.

We claim:

1. A sootblower having a lance tube with one or more nozzles for projecting a stream of blowing medium against surfaces within a boiler, said lance tube being periodically advanced into and out of the boiler and simultaneously rotated such that the stream of blowing medium projecting from the nozzle traces a helical path, said sootblower comprising;
    drive train means for driving said lance tube to undergo said longitudinal and rotational motions in a synchronized manner thereby causing said nozzles to trace said helical path, and
    indexing means for displacing the position of said helical path from one sootblower actuation cycle to another such that the helical paths traced by said nozzle are longitudinally offset between said actuation cycles.

2. A sootblower according to claim 1 wherein said displacing occurs between successive actuation cycles.

3. A sootblower according to claim 1 wherein said drive train means is carried by a movable carriage coupled to said lance tube and includes a drive motor driving said lance tube for rotation and driving at least one pinion gear meshing with a longitudinal toothed rack for driving said lance tube longitudinally.

4. A sootblower according to claim 3 wherein said indexing means indexes said pinion gear with respect to said rack upon each actuation cycle.

5. A sootblower according to claim 4 wherein said indexing means comprises said rack having a fixed rack section and a moveable rack section, said rack sections interengaging at longitudinally displaced first and second positions, and means for moving said rack sections to said first position during a portion of the actuation cycle of said sootblower, and for moving said rack sections to said second position during another portion of the actuation cycle of said sootblower, whereby said pinion gear is indexed with respect to said rack upon each actuation cycle.

6. A sootblower according to claim 5 wherein said means for moving comprises biasing means acting on said movable rack section urging it to said first position whereby rotation of said pinion gear when meshing with said movable rack section urges said movable rack section to move to said second position against said biasing means, and wherein said movable rack section returns to said second position when said pinion gear is not engaging said movable rack section.

7. A sootblower according to claim 5 wherein said rack sections include cut-away end portions enabling said end portions to overlap.

8. A sootblower according to claim 5 wherein said longitudinally displaced first and second positions are displaced a distance equal to a multiple of the tooth pitch spacing of said rack fixed and movable sections.

9. A sootblower having a lance tube with one of more nozzles for projecting a stream of blowing medium against surfaces within a boiler, said lance tube being periodically advanced into and out of the boiler and simultaneously rotated such that the stream of blowing medium projecting from the nozzle traces a helical path, said sootblower comprising;
    a frame,
    at least one longitudinally extending toothed rack assembly affixed to said frame,
    a carriage for traveling along said frame and coupled to said lance tube for controlling the longitudinal and rotational motion of said lance tube, said carriage including drive train means driven by a motor for rotating said lance tube and moving said carriage longitudinally through one or more pinion gears engagable with said toothed rack assembly, said drive train establishing a synchronized relationship between said longitudinal and said rotational motions of said lance tube thereby causing said nozzle to trace said helical path, and
    said rack assembly including interengaging fixed and movable portions, said movable portion being longitudinally movable between a first and second position, and biasing means urging said movable portion toward said first position, whereby during a portion of the operating cycle of said sootblower, said pinion gear engages said movable portion moving it to said second position against said biasing means and thereafter moves out of engagement with said movable portion allowing said movable portion to return to said first position under the influence of said biasing means, whereby said pinion gear is indexed with respect to said rack assembly upon each actuation cycle of said sootblower causing said helical path to be displaced between successive actuation cycles of said sootblower.

10. A sootblower according to claim 9 wherein said rack sections include cut-away end portions enabling said end portions to overlap.

11. A sootblower according to claim 9 wherein said longitudinally displaced first and second positions are displaced a distance equal to a multiple of the tooth pitch spacing of said rack fixed and movable portions.

* * * * *